US010719089B2

(12) United States Patent
Imsland et al.

(10) Patent No.: US 10,719,089 B2
(45) Date of Patent: Jul. 21, 2020

(54) APPARATUS AND METHODS TO CHARACTERIZE FLUID CONTROL VALVES

(71) Applicant: FISHER CONTROLS INTERNATIONAL LLC, Marshalltown, IA (US)

(72) Inventors: Thomas A. Imsland, Marshalltown, IA (US); Jeffrey Dean Seyller, Colo, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 47 days.

(21) Appl. No.: 15/599,145

(22) Filed: May 18, 2017

(65) Prior Publication Data

US 2018/0335790 A1    Nov. 22, 2018

(51) Int. Cl.
*G05D 7/06*    (2006.01)
*F16K 37/00*   (2006.01)

(52) U.S. Cl.
CPC ....... *G05D 7/0635* (2013.01); *F16K 37/0041* (2013.01); *F16K 37/0083* (2013.01)

(58) Field of Classification Search
CPC ............. G05D 7/0635; F16K 37/0083; F16K 37/0041
See application file for complete search history.

(56) References Cited

U.S. PATENT DOCUMENTS

| | | | |
|---|---|---|---|
| 6,889,121 B1* | 5/2005 | Shahroudi | H01F 7/1805 251/129.18 |
| 8,991,268 B2 | 3/2015 | Crespo Vidal | |
| 2008/0071425 A1* | 3/2008 | Laverdiere | G05D 7/0635 700/283 |
| 2011/0260085 A1 | 10/2011 | van der Zee et al. | |
| 2012/0139725 A1 | 6/2012 | Grumstrup | |
| 2012/0325321 A1* | 12/2012 | Perry | B23Q 11/1023 137/1 |
| 2013/0047745 A1* | 2/2013 | Vidal | F16K 37/0083 73/862.53 |
| 2013/0068313 A1* | 3/2013 | George | F16K 37/0041 137/14 |

(Continued)

FOREIGN PATENT DOCUMENTS

WO    WO09915822    *    4/1999

OTHER PUBLICATIONS

Emerson, "Fisher(TM) Fieldvue(TM) DVC6200 Series Digital Valve Controllers," brochure, Emerson Automation Solutions, Fisher Controls International LLC, 2017, 16 pages.

(Continued)

*Primary Examiner* — Yuhui R Pan
(74) *Attorney, Agent, or Firm* — Hanley, Flight & Zimmerman, LLC (57) ABSTRACT

Apparatus and methods to characterize fluid valves are disclosed. An example apparatus includes a fluid valve having a valve seat and a flow control member to sealingly engage the valve seat. The apparatus includes a sensor to detect a change in position of the flow control member. The apparatus includes a processor to determine at least one of a seating point or a breakout point corresponding to the flow control member based on the change in position.

18 Claims, 9 Drawing Sheets

(56) References Cited

U.S. PATENT DOCUMENTS

2013/0228005 A1    9/2013   Suedel et al.
2015/0149100 A1    5/2015   Eisenbeis et al.

OTHER PUBLICATIONS

Emerson Process Management, "FlowScanner(TM) 6000 SGIM-1 and SGIM-2 Strain Gauge Interfaces," Product Bulletin, 56.1:6000-SGIM-1 and SGIM-2, Jun. 2003, 12 pages.

Emerson, "ValveLink(TM) Software," Product Bulletin, 62.1:ValveLink Software, Jan. 2017, 16 pages, [www.Fisher.com].

Patent Cooperation Treaty, "International Search Report," issued in connection with International Application No. PCT/US2018/030176, dated Jul. 30, 2018, 6 pages.

Patent Cooperation Treaty, "Written Opinion of the International Searching Authority," issued in connection with International Application No. PCT/US2018/030176, dated Jul. 30, 2018, 7 pages.

* cited by examiner

APPARATUS AND METHODS TO CHARACTERIZE FLUID CONTROL VALVES

FIELD OF THE DISCLOSURE

This disclosure relates generally to fluid control devices and, more particularly, to apparatus and methods to characterize fluid control valves.

BACKGROUND

In recent years, industrial plants and manufacturers have developed and implemented advanced fluid valve controllers for production and workflow control. These known fluid valve controllers monitor and control fluid valves to govern process fluids (e.g., natural gas, water, etc.) within a process control system. In particular, the valve controllers control flow of the process fluids by moving or displacing valve plugs (e.g., via actuators) based on settings and/or parameters that may be manually programmed. Such valve plugs have associated implementation and/or design parameters such as seating forces/torques, breakout forces/torques, breakout times, etc. These parameters are typically determined or calculated based on manual measurements, which can be time consuming and/or labor intensive to perform.

SUMMARY

An example apparatus includes a fluid valve having a valve seat and a flow control member to sealingly engage the valve seat. The apparatus includes a sensor to detect a change in position of the flow control member. The example apparatus also includes a processor to determine at least one of a seating point or a breakout point corresponding to the flow control member based on the change in position.

An example method includes detecting, via a sensor, a change in position of a flow control member of a fluid valve. The flow control member sealingly engages a valve seat. The example method also includes determining, via a processor, at least one of a seating point or a breakout point corresponding to the flow control member based on the change in position.

An example tangible machine-readable storage medium includes instructions which, when executed, cause a processor to detect a change in position of a flow control member via a sensor. The flow control member is to sealingly engage a valve seat of a fluid valve. The instructions further cause the processor to calculate at least one of a seating point or a breakout point corresponding to the flow control member based on the change in position.

The figures disclosed herein are not to scale. Wherever possible, the same reference numbers will be used throughout the drawings and accompanying written descriptions to refer to the same or like parts. As used in this disclosure, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Apparatus and methods to characterize fluid control valves are disclosed. Industrial plants and manufacturers typically utilize fluid valves to control process fluids (e.g., natural gas, water, etc.) within a process control system. Often, these known fluid valves are controlled by valve controllers that have sensors (e.g., flow meters, hall effect sensors, etc.) to monitor parameters associated with these fluid valves, such as flow rates, positions of valve plugs, etc. To control movement of the process fluids, these conventional valve controllers move (e.g., move via an actuator) a valve plug between an open position and a closed position relative to a valve seat at least partially based on the monitored parameters. Valve plug movement is typically governed by parameters and/or settings that are programmed into a valve controller, which may include a seating force, a breakout force, a breakout time, etc. However, the process to determine, set and/or adjust these parameters may necessitate manual labor and time including determining a seating point and a breakout point associated with the fluid valves. Further, manual determination(s) and/or adjustment(s) may be subject to operator error.

The examples disclosed herein characterize operation of a fluid valve (e.g., a sliding stem valve, a rotary valve, etc.) by defining a seating point and/or a breakout point associated with the fluid valve. The seating point and the breakout point are determined to facilitate effective control of the fluid valve. Once the seating point and the breakout point are determined, these points (e.g., parameter values corresponding to these points) may be programmed to the valve controllers. The examples disclosed herein quickly and accurately determine the seating point and/or the breakout point by reducing potential error as well as time associated with manual determination(s). Further, by automating the process of determining the seating point and/or the breakout point of the fluid valve, characterization can be performed in parallel (e.g., multiple fluid valves may be characterized simultaneously), thereby reducing commissioning time and the associated costs.

Some disclosed examples implement a processor to determine and/or calculate a seating point and/or a breakout point of a fluid valve based on measurements from a sensor (e.g., a hall effect sensor, a potentiometer, a visual position sensor, etc.) that is communicatively coupled to and/or disposed within the fluid valve. In particular, the sensor detects a change in position of a flow control member (e.g., a valve plug, etc.). In other words, the processor determines and/or calculates the seating point and/or the breakout point of the fluid valve based on the change in the position of the flow control member. In some examples, the sensor monitors the position of the flow control member during normal operation of the fluid valve (e.g., closure or opening of the fluid valve, etc.). Additionally or alternatively, the sensor measures a velocity and/or an acceleration of the flow control member and the processor compares the velocity and/or the acceleration to one or more thresholds (e.g., a pre-determined threshold, a calculated threshold, etc.) to determine the seating point or the breakout point. In other examples, the processor compares a measured position of the flow control member to a threshold position. In some examples, the processor calculates, determines and/or updates one or more parameters and/or settings relating to the flow control member and/or the fluid valve, such as a seating force, a breakout force and/or a breakout time of the fluid valve.

As used herein, the term "seating point" refers to a position in which a valve plug is considered to have begun contact and/or engaged a valve seat of the fluid valve. As used herein, the term "breakout point" refers to a position in which the valve plug has left and/or begun to leave an end of travel corresponding to the closed position and/or disengages from the valve seat.

Figure 1:
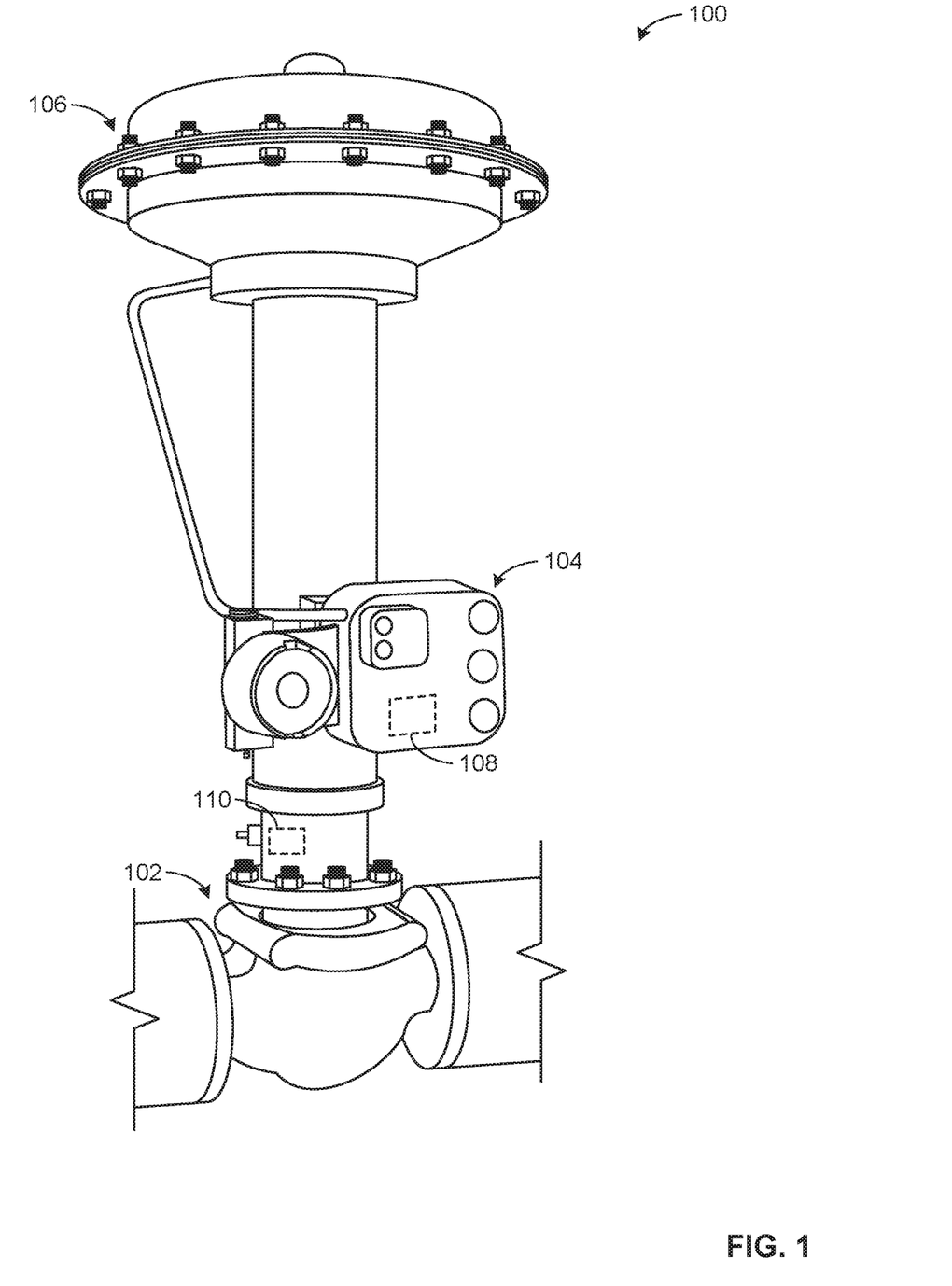
FIG. 1 illustrates an example process control node in which the examples disclosed herein may be implemented.

FIG. 1 illustrates an example process control node 100 in which the examples disclosed herein may be implemented. The example process control node 100 includes a fluid valve 102 and a valve controller 104. The example process control node 100 also includes a pneumatic actuator 106, a processor (e.g., a control processor) 108, which is implemented in the valve controller 104 in this example, and a sensor 110. According to the illustrated example of FIG. 1, the fluid valve 102 can be a sliding stem valve, a rotary valve, etc. that is operable to control flow of a process fluid (e.g., natural gas, water, etc.) flowing through the fluid valve 102.

In this example, the fluid valve 102 is a sliding stem fluid valve having the actuator 106 operatively coupled thereto. A flow control member or valve plug 202 (shown in FIG. 2) controls flow of the process fluid. The example actuator 106 may be a pneumatic actuator, a hydraulic actuator, an electric actuator, etc. that causes movement of the valve plug 202 between an open state and a closed state. According to the illustrated example, when the fluid valve 102 is in the closed state, the process fluid is substantially prevented from flowing therethrough. Conversely, when the fluid valve 102 is in the open state, the process fluid is enabled to flow therethrough.

In this example, the actuator 106 is a pneumatic actuator that responds to an input fluid pressure provided to the actuator 106. The input fluid pressure is controlled by the valve controller 104 and causes the actuator 106 to generate an output force (or torque) and/or pressure to move the valve plug 202, which is explained in greater detail below in connection with FIG. 2.

To monitor operation of the fluid valve 102, the example sensor (e.g., a hall effect sensor, a transducer, etc.) 110 measures parameters associated with the fluid valve 102 such as, for example, a position, a velocity, an acceleration and/or a movement change (e.g., a change in velocity or acceleration) of the valve plug 202, a relative output force and/or pressure of the actuator 106, etc. In some examples, the sensor 110 is disposed within the valve controller 104, the fluid valve 102, and/or any other suitable location (e.g., an external location) to detect these parameters.

The example valve controller 104 includes the processor 108, but in other examples the processor 108 may be external to the valve controller 104 and/or communicatively coupled to the valve controller 104 from a remote location (e.g., a control room, a remote server, etc.). In particular, the processor 108 may communicate with the valve controller 104 by using one or more wired and/or wireless communication networks, such as a process control network associated with the fluid valve 102 and/or the valve controller 104. According to the illustrated example, the processor 108 controls the fluid valve 102 by executing one or more programs to vary the output force and/or pressure of the actuator 106 and, thus, vary the movement of valve plug 202. This controlled and/or actuated movement of the valve plug 202 can be controlled by parameters and/or settings that are programmed into the valve controller 104 and/or the processor 108. The programmed parameters and/or settings may be related to a seating force, a breakout force and/or breakout time associated with the fluid valve 102 as explained in greater detail below.

Figure 2:
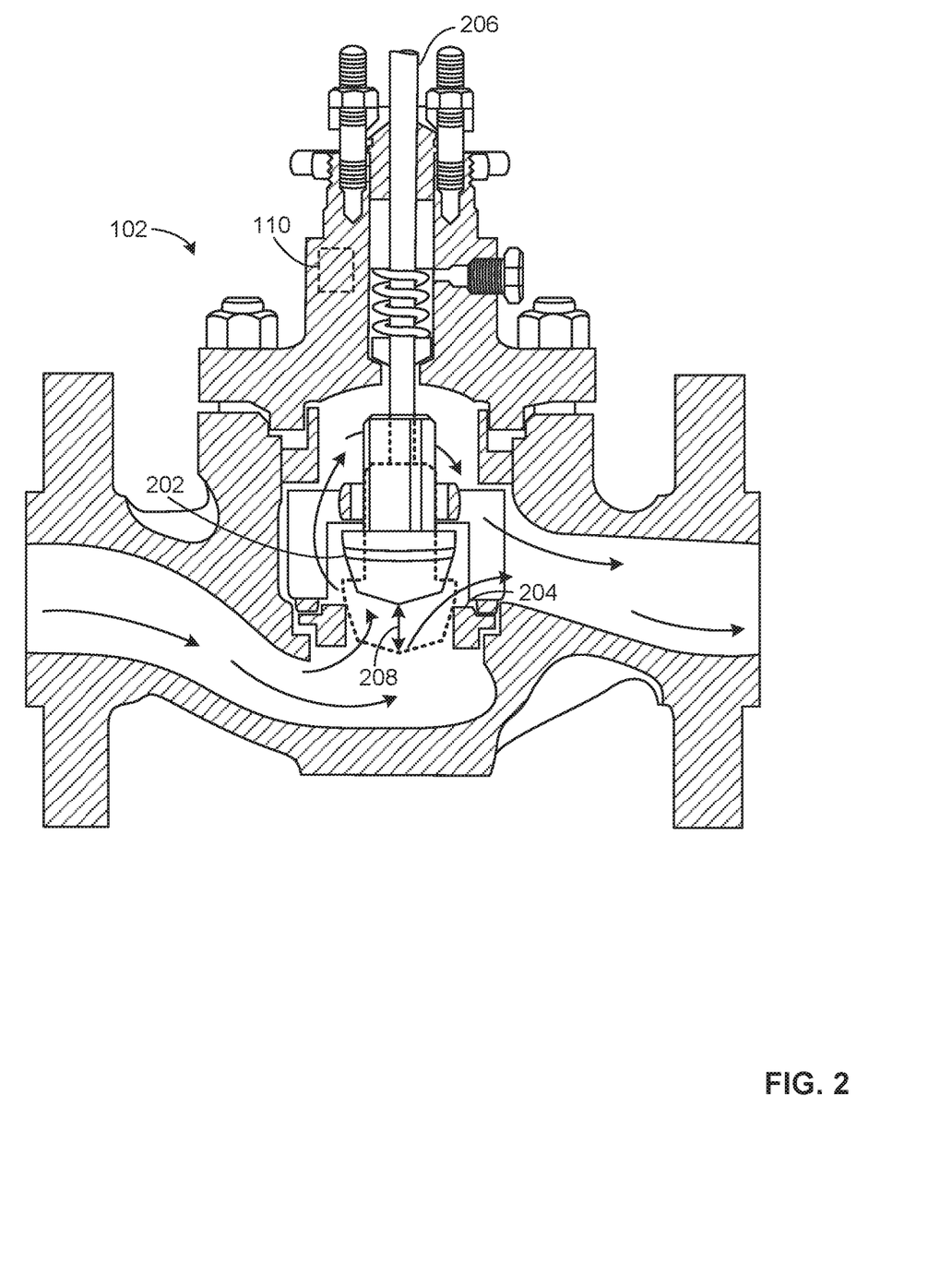
FIG. 2 is a detailed cross-sectional view of the example fluid valve of FIG. 1.

FIG. 2 is a detailed cross-sectional view of the example fluid valve 102 of FIG. 1. According to the illustrated example, the flow control member 202 mentioned above in connection with FIG. 1 may be any suitable valve plug (e.g., a cylindrical plug, a conical plug, a tapered plug, etc.) that varies the flow of the process fluid through the fluid valve 102 when moved relative to (e.g., toward and/or away from) a valve seat 204 via movement of a valve stem 206. In particular, the example flow control member 202 moves along a direction generally indicated by a double arrow 208 between an open position and a closed position of the fluid valve 102, both of which are shown in FIG. 2 for clarity. In the illustrated example of FIG. 2, when the flow control member 202 is in the closed position (represented by the dotted/dashed lines of FIG. 2), the flow control member 202 contacts and/or sealingly engages the valve seat 204, thereby significantly reducing or preventing flow of the process fluid.

As described above, the sensor 110 of the fluid valve 102 detects a position, a change in the position and/or displacement of the flow control member 202. In this example, the sensor (e.g., a hall effect sensor) 110 measures position(s) of the flow control member 202 corresponding to the open position and/or the closed position. Additionally or alternatively, the sensor 110 repeatedly, periodically and/or continuously detects the position and/or the change in the position of the flow control member 202 to be repeatedly and/or continuously provided to the valve controller 104 and/or the processor 108. In other examples, the sensor 110 is implemented as a flow rate and/or a fluid flow sensor.

Operation and control of the fluid valve 102 is at least partially dependent on a seating point and/or a breakout/breakaway point associated with the fluid valve 102. For example, a force sufficient to move the flow control member 202 to the seating point in which the flow control member 202 is considered to have begun contact and/or engaged the valve seat 204 in the closed position may be determined to control movement of the flow control member 202. Likewise, a force sufficient to move the flow control member 202 from the breakout point at which the flow control member 202 has begun to separate from an end of travel and/or disengage from closure against the valve seat 204 (e.g., the flow control member 202 leaves from an extreme closure position) may be determined to govern movement of the flow control member 202. According to the examples disclosed herein, to facilitate effective and precise control of the fluid valve 102 by the actuator 106, the seating point and/or the breakout point are calculated and/or determined, as disclosed in greater detail below in connection with FIGS. 5 and 6. In some examples, a seating force, a breakout force and/or a time to breakout (e.g., a breakout time) associated with the fluid valve 102 are determined based on the seating point and/or the breakout point.

Figure 3:
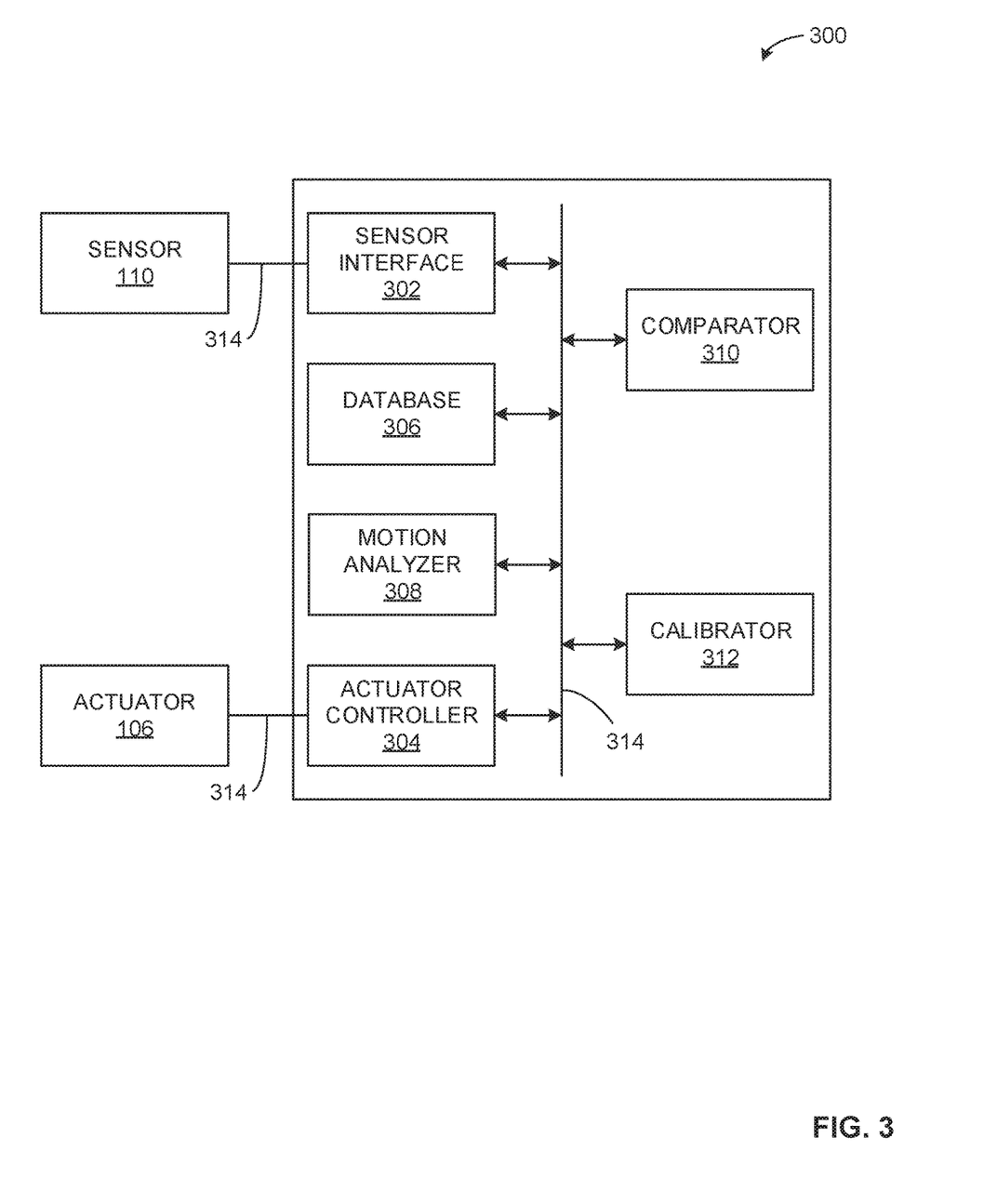
FIG. 3 is a block diagram of an example valve characterization system in accordance with the teachings of this disclosure.

FIG. 3 is a block diagram of an example valve characterization system 300 in accordance with the teachings of this disclosure. The example valve characterization system 300 may be used to implement the valve controller 104, the processor 108 and/or the example process control node 100 of FIG. 1. The valve characterization system 300 of the illustrated example includes a sensor interface 302, an actuator controller 304, a database 306, a motion analyzer 308, a comparator 310, and a calibrator 312. In this example, the valve characterization system 300 also includes the actuator 106, and the sensor 110 of FIG. 1.

In the illustrated example of FIG. 3, the sensor interface 302 is communicatively coupled to the sensor 110. In particular, the sensor 110 provides the detected position and/or the detected change in the position (e.g., a velocity, an acceleration, etc.) of the flow control member 202 to the sensor interface 302 via communication link(s) 314 such as, for example, signal transmission wires or busses, radio frequency, etc.

The actuator controller 304 of the illustrated example is communicatively and/or operatively coupled to the actuator 106 (e.g., via the communication link(s) 314) to control the actuator 106 and, as a result, movement of the flow control member 202. In particular, the example actuator controller 304 varies the input fluid pressure provided to the actuator 106 and, thus, varies the output pressure and/or force provided by the actuator 106, thereby causing the flow control member 202 to move.

According to the illustrated example, the database 306 stores and/or provides access to data associated with the valve controller 104, the fluid valve 102 and/or, more generally, the example process control node 100. For example, as the sensor 110 detects (e.g., continuously or repeatedly) the position and/or the change in the position of the flow control member 202 during use of the fluid valve 102, the database 306 receives (e.g., via the sensor interface 302) and stores a position and/or a change in the position measured at the sensor 110. Additionally or alternatively, the database 306 receives one or more respective times or timestamps associated with the detected position and/or the change in the position of the flow control member 202.

In some examples, the database 306 stores one or more settings relating the flow control member 202 and/or, more generally, to the fluid valve 102. For example, a setting may include a seating force (e.g., measured as pound force (lbf), pounds per square inch (psi), etc.) to be provided by the actuator 106 to cause the flow control member 202 to sealingly engage with the valve seat 204 (e.g., during a closure operation). Similarly, in some examples, a setting may include a breakout force and/or breakout time to be accounted for during operation of the actuator 106 to disengage the flow control member 202 from the valve seat 204 (e.g., during an opening operation). According to the illustrated example, the seating point and/or the breakout point are utilized by the calibrator 312 to determine or calculate an advantageous seating force, a breakout force, and/or a breakout time of the fluid valve 102 based on one or more suitable algorithms, equations and/or techniques related to the seating point and/or the breakout point.

The motion analyzer 308 of the illustrated example determines and/or calculates different motion characteristics (e.g., a velocity, an acceleration, etc.) of the flow control member 202 to characterize movement and/or associated forces of the flow control member 202. For example, when the actuator 106 causes the flow control member 202 to move relative to the valve seat 204, the motion analyzer 308 processes, generates and/or analyzes associated data (e.g., position, movement, and/or time data) from the sensor 110 that may be stored in the database 306 to calculate and/or determine a velocity of the flow control member 202. Additionally or alternatively, in other examples, the motion analyzer 308 calculates and/or determines an acceleration of the flow control member 202 based on the detected movement. In some examples, the motion analyzer 308 transmits (e.g., via the wired and/or wireless communication link(s) 314) computed data associated with motion of the flow control member 202 to the database 306.

In some examples, the comparator 310 performs one or more comparisons between threshold data and/or characteristic flow data stored in the database 306 and measurements from the sensor 110 to determine and/or characterize the seating point and/or the breakout point of the fluid valve 102. For example, the comparator 310 may compare the velocity (e.g., the velocity calculated and/or determined by the motion analyzer 308) of the flow control member 202 to a threshold velocity (e.g., a calculated and/or a pre-determined value) to determine the seating point of the fluid valve 102 based on movement of the flow control member 202 toward the valve seat 204 (e.g., during a closure operation of the fluid valve 102).

Additionally or alternatively, in some examples, the comparator 310 compares the acceleration (e.g., the acceleration calculated and/or determined by the motion analyzer 308) of the flow control member 202 to a threshold acceleration (e.g., a calculated and/or a pre-determined value) to determine the breakout point of the fluid valve 102 based on movement of the flow control member 202 away from the valve seat 204 (e.g., provided by an opening operation of the fluid valve 102). In some examples, the comparator 310 compares the position and/or the change in the position of the flow control member 202 to a threshold position (e.g., a calculated and/or pre-determined value) to determine the breakout point of the fluid valve 102. In some examples, the comparator 310 transmits and/or provides (e.g., via the wired and/or wireless communication link(s) 314) determinations to the database 306.

The calibrator 312 of the illustrated example calculates and/or determines calibration values associated with operating parameters, configuration inputs and/or settings relating to the flow control member 202 and/or, more generally, to the fluid valve 102 (e.g., the seating force, the breakout force, the breakout time, etc.). In particular, the calibrator 212 may characterize unique and/or situational operating behavior of the flow control member 202 and/or the fluid valve 102 based on comparisons performed by the comparator 310 and/or motion of the flow control member 202 analyzed by the motion analyzer 308. Additionally or alternatively, the calibrator 312 is used to analyze trends and/or drifting (e.g., long term trends) of the breakout force and/or the seating force to update the operating parameters and/or the settings (e.g., input settings are calculated based on an algorithm that utilizes measured output values).

While an example manner of implementing the example valve controller 104, the fluid valve 102 and/or, more generally, the example process control node 100 of FIG. 1 is illustrated in FIG. 3, one or more of the elements, processes and/or devices illustrated in FIG. 3 may be combined, divided, re-arranged, omitted, eliminated and/or implemented in any other way. Further, the example sensor interface 302, the actuator controller 304, the database 306, the motion analyzer 308, the comparator 310, the calibrator 312 and/or, more generally, the valve characterization system 300 of FIG. 3 may be implemented by hardware, software, firmware and/or any combination of hardware, software and/or firmware. Thus, for example, any of the example sensor interface 302, the actuator controller 304, the database 306, the motion analyzer 308, the comparator 310, the calibrator 312 and/or, more generally, the valve characterization system 300 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interface 302, the actuator controller 304, the database 306, the motion analyzer 308, the comparator 310, the calibrator 312 is/are hereby expressly defined to include a tangible computer readable storage device or storage disk such as a memory, a digital versatile disk (DVD), a compact disk (CD), a Blu-ray disk, etc. storing the software and/or firmware. Further still, the example configuration 300 of FIG. 3 may include one or more elements, processes and/or devices in addition to, or instead of, those illustrated in FIG. 3, and/or may include more than one of any or all of the illustrated elements, processes and devices.

Figure 4A:
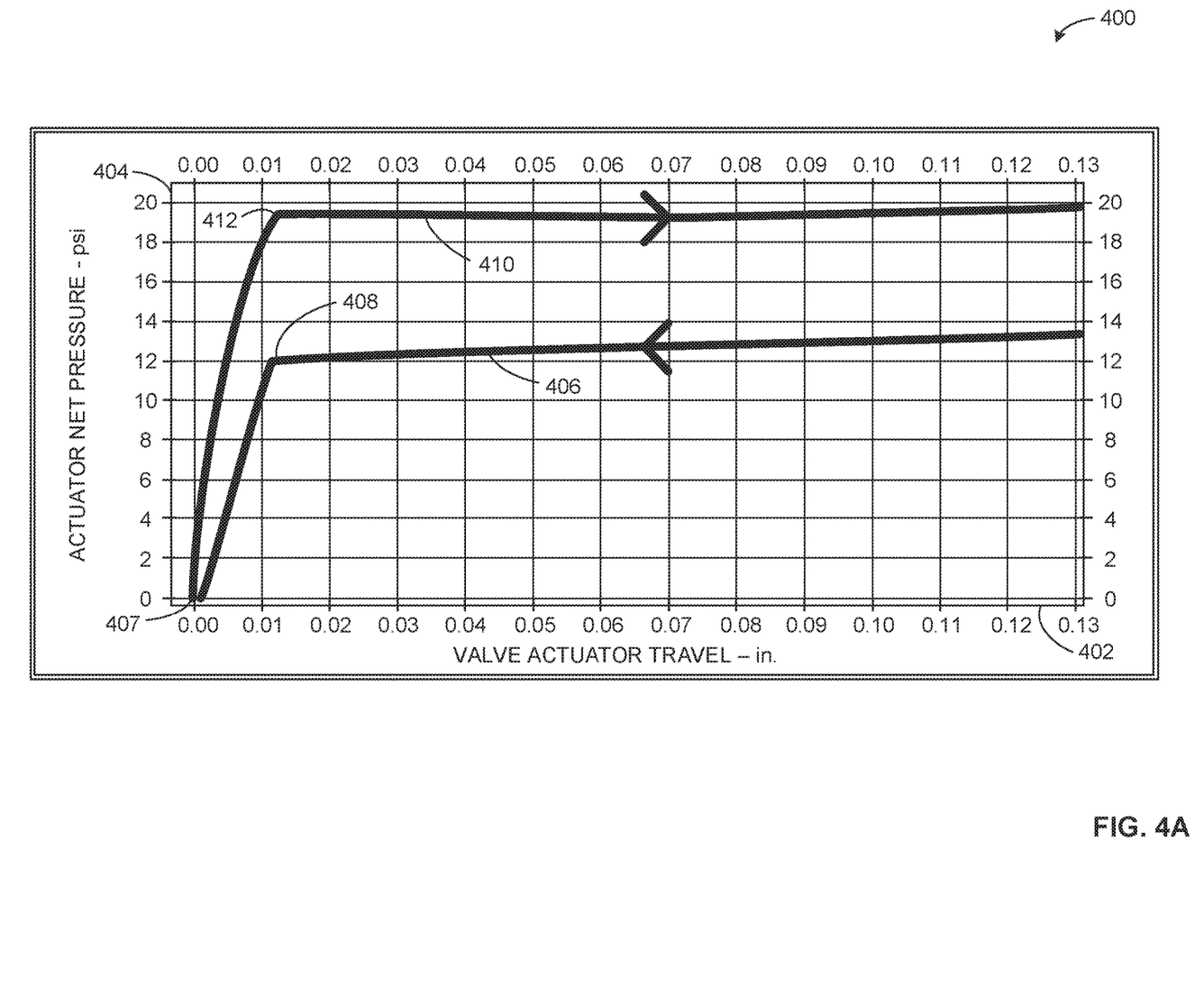
FIGS. 4A, 4B, and 4C are example graphs illustrating example characterizations in accordance with the teachings of this disclosure.

FIG. 4A is an example graph 400 illustrating an example characterization of the fluid valve 102 in accordance with the teachings of this disclosure. The graph 400 includes a horizontal axis 402 that corresponds to position data and/or relative displacement measured by the sensor 110. According to the illustrated example, the graph 400 also includes a vertical axis 404 that represents output force and/or pressure (psi) provided by the actuator 106.

According to the illustrated example, a first curve 406 characterizes movement of the flow control member 202 from the open position towards the closed position 407 in which the flow control member 202 is seated against the valve seat 204 (e.g., provided by a closure operation of the fluid valve 102). In other words, the first curve 406 represents a return of the flow control member 202 to the valve seat 204 to close the fluid valve 102. Therefore, movement along the first curve 406 is from right to left (in the view of FIG. 4A). Accordingly, a rightmost portion of the graph 400 (in the view of FIG. 4A) represents the fluid valve 102 being open while a leftmost portion of the graph 400 represents the fluid valve 102 being closed.

The first curve 406 represents an initial output force and/or pressure (represented by a value of approximately 13 psi on the vertical axis 404) of the actuator 106 causing the flow control member 202 to accelerate and/or move toward the valve seat 204 to the closed position 407. A transition point 408 of the first curve 406 is seen as the flow control member 202 begins to engage the valve seat 204. To the left of the transition point 408 (in the view of FIG. 4A), the flow control member 202 compresses the valve seat 204 as a velocity of the flow control member 202 decreases. According to the illustrated example, the transition point 408 of the first curve 406 is associated with and/or defines the seating point of the fluid valve 102. In some examples, the decreasing velocity of the flow control member 202 can be advantageously utilized by the valve characterization system 300 to calculate a characteristic seating point of the fluid valve 102.

According to the illustrated example, a second curve 410 characterizes movement of the flow control member 202 away from the valve seat 204 to the open position (e.g., provided by an opening operation of the fluid valve 102). Accordingly, the second curve 410 represents a breakout of the flow control member 202 away from the valve seat 204. Therefore, in the illustrated example, movement along the second curve 410 is from left to right in the view of FIG. 4A.

As represented by the second curve 410, when the flow control member 202 disengages from the valve seat 204, a transition point 412 of the second curve 410 is defined. This transition point 412 indicates a point where an increased breakout pressure is no longer necessary to move the flow control member 202 from the valve seat 204. According to the illustrated example, as the output force and/or pressure provided by the actuator 106 to the flow control member 202 increases (e.g., to the left of the transition point 412 in the view of FIG. 4A), the flow control member 202 moves a small distance (e.g., 0.01 inches, 0.001 inches, etc.) relative to the valve seat 204 before reaching the transition point 412. As a result, the acceleration of the flow control member 202 may temporarily increase. This acceleration of the flow control member 202 is associated with the breakout point of the fluid valve 102. In some examples, the valve characterization system 300 determines a characteristic breakout point of the fluid valve 102 based on the acceleration of the flow control member 202.

Figure 4B:
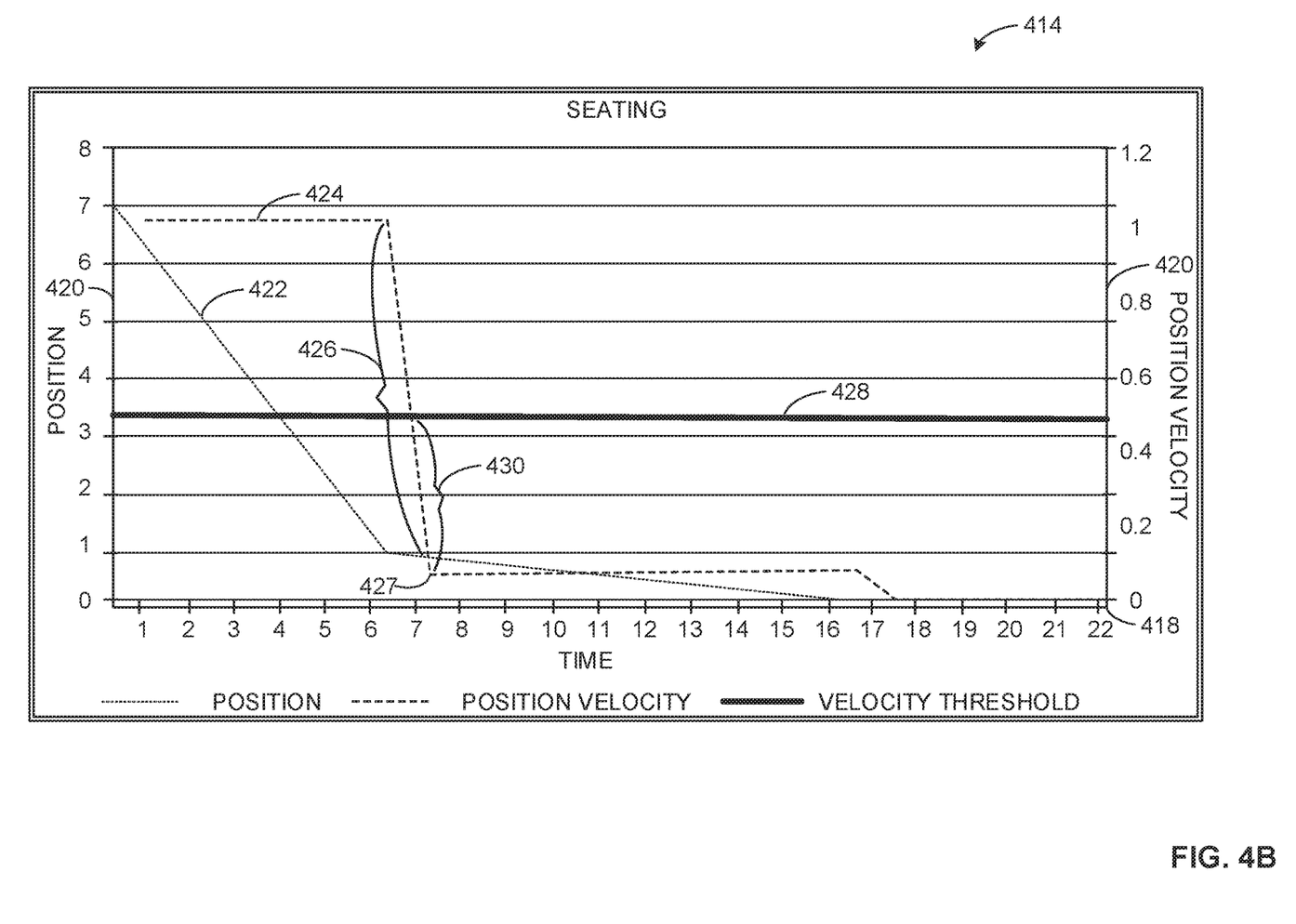
Figure 4C:
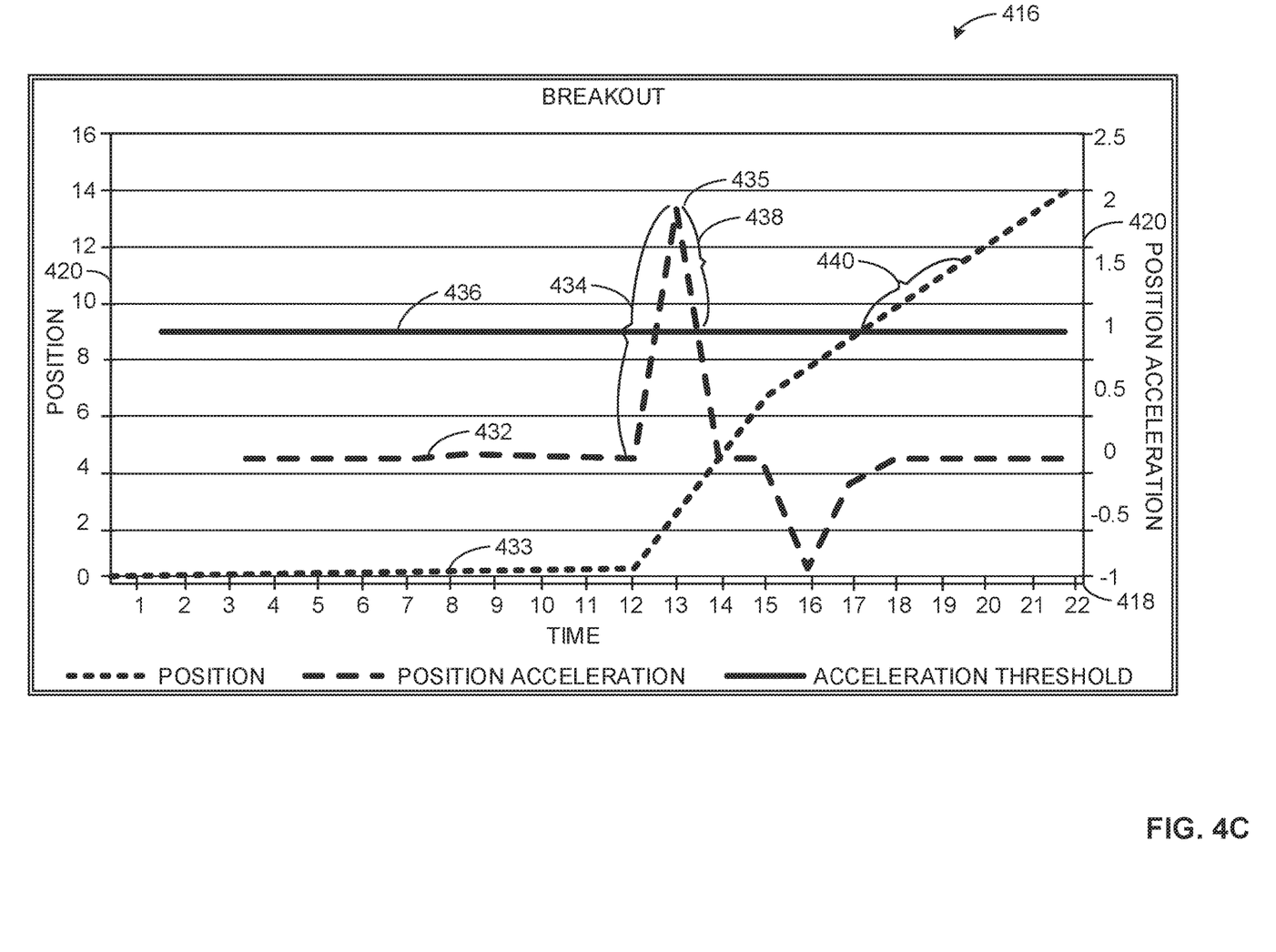

FIGS. 4B and 4C are additional example graphs 414, 416 illustrating an example characterization of the fluid valve 102 in accordance with the teachings of this disclosure. Each of the graphs 414, 416 includes a horizontal axis 418 that represents time data. Each of the example graphs 414, 416 also includes a vertical axis 420 that represents position data and/or movement (e.g., velocity and/or acceleration) measured by the sensor 110.

Turning to FIG. 4B, a position curve 422 represents movement of the flow control member 202 toward the valve seat 204 (e.g., provided by a closure operation of the fluid valve 102). Accordingly, a left region of the graph 414 (in the view of FIG. 4B) represents opening of the fluid valve 102.

In this example, a velocity curve 424 corresponds to the position curve 422 and represents velocity of the flow control member 202. As shown in FIG. 4B, the velocity curve 424 has a portion 426 in which the velocity of the flow control member 202 is decreasing (e.g., from engaging and/or compressing the valve seat 204). According to the illustrated example, this portion 426 of the velocity curve 424 is associated with a characteristic seating point, which is indicated by a point 427 in FIG. 4B. The portion 426 and/or a shape of the velocity curve 424 (e.g., inflections, minima, changes in slope, etc.) can be advantageously utilized by the valve characterization system 300 to determine the characteristic seating point.

In some examples, a threshold 428 (e.g. a threshold velocity) is utilized to determine the seating point. In such examples, the valve characterization system 300 determines the seating point of the fluid valve 202 when the flow control member 202 has a velocity that meets and/or passes the threshold 428. In particular, the valve characterization system 300 may determine the seating point based on a portion 430 of the velocity curve 424 that extends below the threshold velocity 428. In some examples, the valve characterization system 300 determines the seating point based on any appropriate portion of the velocity curve 424 relative to the threshold 428.

Turning to FIG. 4C, a position curve 433 represents movement of the flow control member 202 away from the valve seat 204 (e.g., provided by an opening operation of the fluid valve 102). Accordingly, a left region of the graph 416 (in the view of FIG. 4C) represents the fluid valve 102 being closed while a right region of the graph 416 represents the fluid valve 102 being opened.

In this example, an acceleration curve 432 corresponds to the position curve 433 and represents an acceleration of the flow control member 202. As clearly shown in FIG. 4C, the acceleration curve 432 has a portion 434 in which the acceleration of the flow control member 202 increases. Accordingly, the portion 434 of the acceleration curve 432 is associated with the breakout point of the fluid valve 202 and can be advantageously utilized by the valve characterization system 300 to determine a characteristic breakout point of the fluid valve 102, which is shown as a point 435 in FIG. 4C.

In some examples, a threshold (e.g., a threshold acceleration and/or a threshold position) 436 is provided to determine the breakout point. In such examples, the valve characterization system 300 may determine the breakout point of the fluid valve 202 when the flow control member 202 has an acceleration that meets and/or extends past the threshold 436 (e.g., a threshold acceleration). For example, the valve characterization system 300 may determine the breakout point based on a portion 438 of the acceleration curve 432 and/or the portion 434 being exceeding the threshold 436. In some examples, the valve characterization system 300 determines the breakout point based on any appropriate portion and/or a characteristic shape (e.g., a peak, an inflection point, etc.) of the acceleration curve 432 relative to the threshold 436.

Additionally or alternatively, in some examples, the valve characterization system 300 determines the breakout point of the fluid valve 202 when a position of the flow control member 202 passes a positional threshold. For example, the valve characterization system 300 determines the breakout point based on a portion 440 of the position curve 433 that is greater than the positional threshold. Any characteristics of the example graphs 400, 414, 416 or combination thereof may be utilized by the examples disclosed herein to characterize a seating point and/or a breakout point. Further, any example appropriate graph characteristics, mathematical relationships and/or curve shape characteristics may be used.

Figure 5:
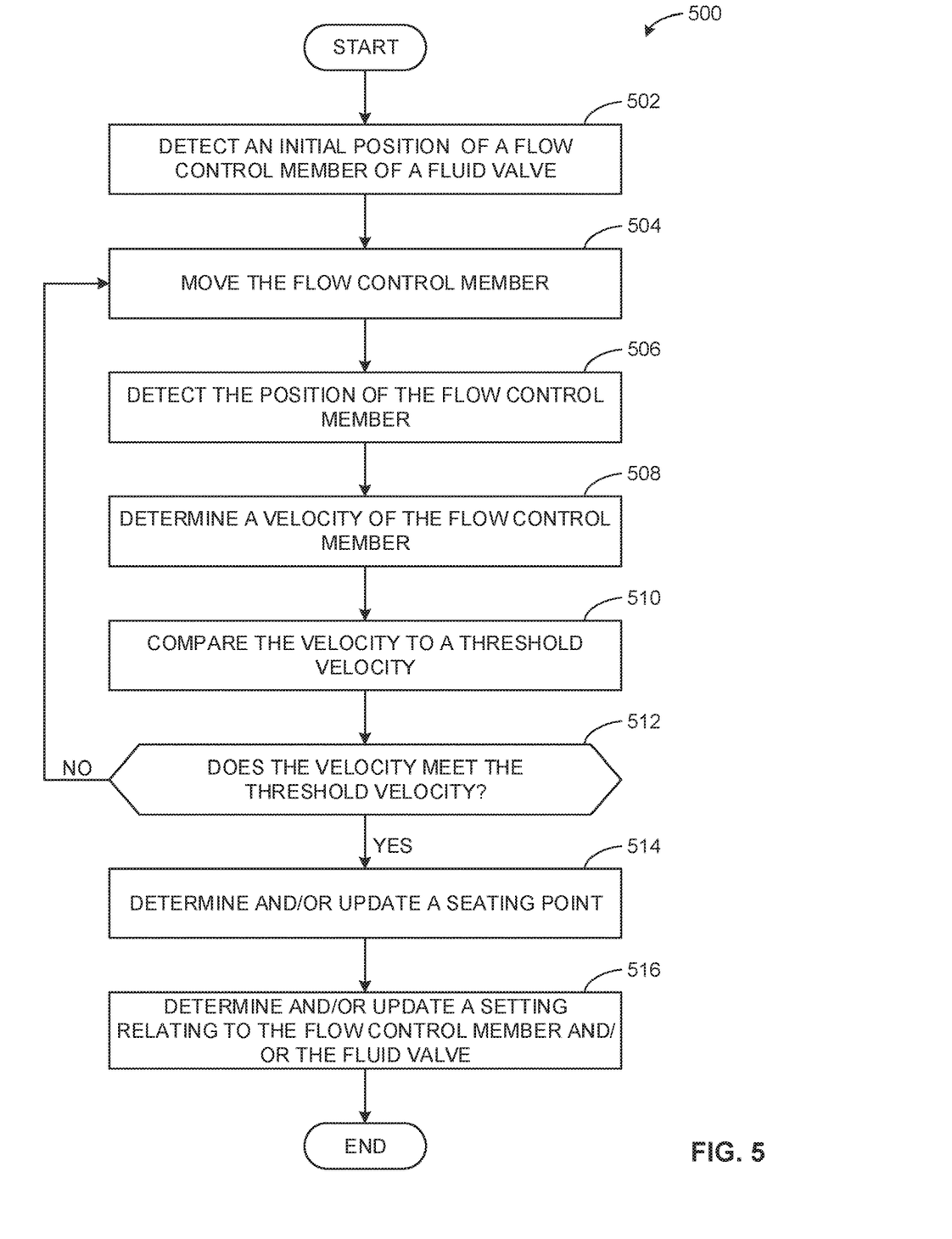
FIGS. 5 and 6 are flowcharts representative of example methods that may be implemented with the examples disclosed herein.
Figure 6:
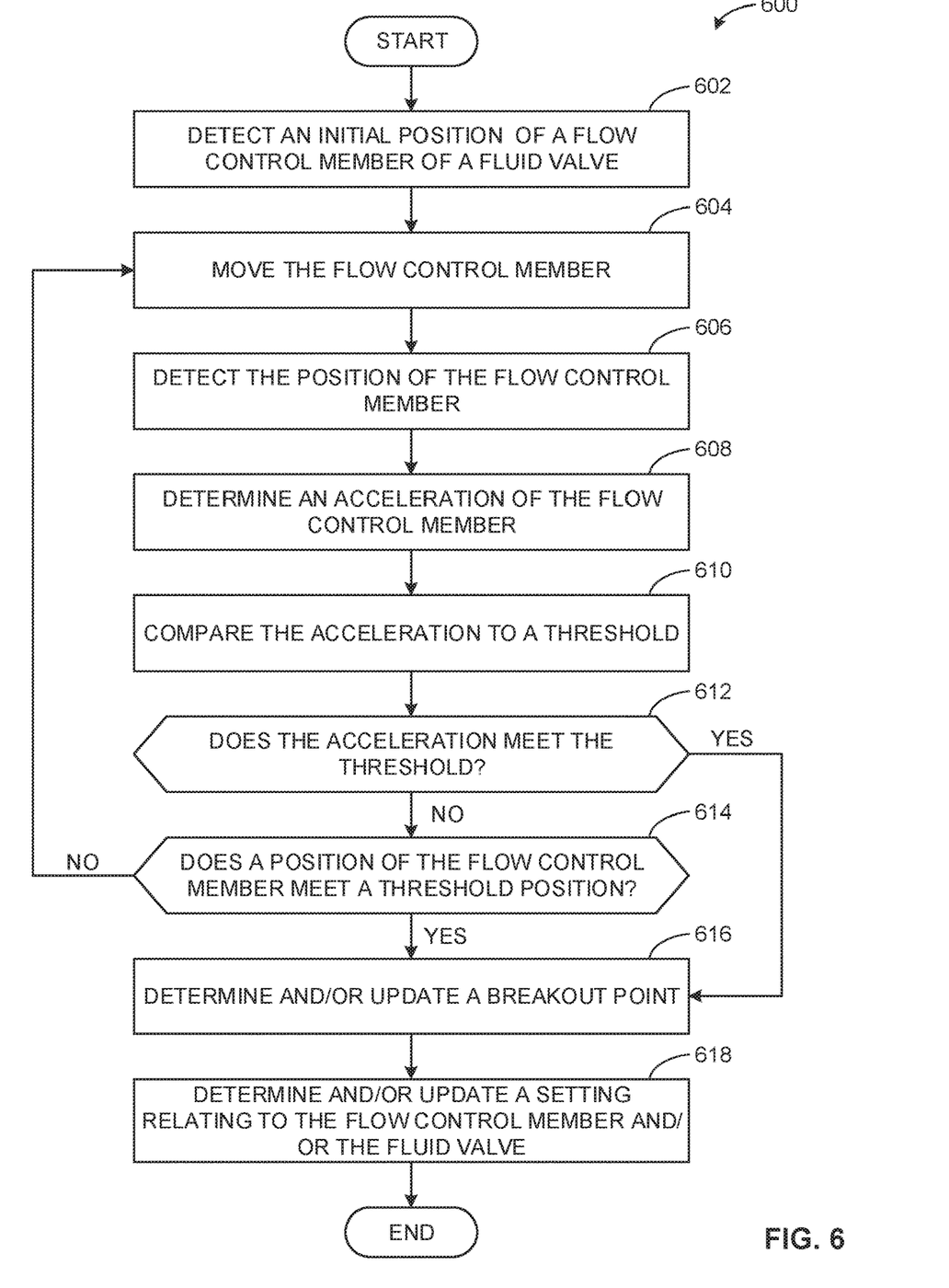

Flowcharts representative of example methods for implementing the valve characterization system 300 of FIG. 3 are shown in FIGS. 5 and 6. In this example, the methods may be implemented using machine-readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 5 and 6, many other methods of implementing the valve characterization system 300 may alternatively be used. For example, the order of execution of the blocks may be changed, and/or some of the blocks described may be changed, eliminated, or combined.

As mentioned above, the example processes of FIGS. 5 and 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5 and 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 5 illustrates a flowchart representative of an example method 500 that may be implemented to characterize operation of one or more fluid valves (e.g., the fluid valve 102 in FIG. 1). The example method 500 can be implemented in any of the example fluid valve 102, the example valve controller 104, the example process control node 100 and/or the example valve characterization system 300 shown in FIGS. 1-3.

The example method 500 of FIG. 5 begins as the sensor 110 detects an initial position and/or a change in the position of the flow control member 202 (block 502). In some examples, the sensor 110 detects the position of the flow control member 202, for example, when the fluid valve 102 is closing and/or the flow control member 202 disengages from the valve seat 204. In some examples, the sensor 110 monitors changes in the position and/or continuously/periodically detects the position of the flow control member 202 during normal use of the fluid valve 102 (e.g., during a typical closure operation of the fluid valve 102, etc.).

According to the illustrated example, when the sensor 110 detects the position and/or the change in the position of the flow control member 202, the valve characterization system 300 stores corresponding positional data in the database 306. In some examples, the database 306 receives one or more times or timestamps (e.g., a relative time and/or a time interval) corresponding to positional measurements.

According to the illustrated example, the flow control member 202 is moved by the actuator (block 504). In particular, the processor 108 controls the output pressure and/or force of the actuator 106 and causes movement of the flow control member 202 as a result. For example, as the output pressure and/or force provided by the actuator 106 increases (e.g., via an input fluid pressure provided to the actuator 106), the flow control member 202 moves toward the valve seat 204 from the open position to the closed position. In some examples, the controlled actuated movement of the flow control member 202 can be governed by parameters and/or settings stored in the database 306, which may be related to the seating force of the fluid valve 102.

Next, the sensor 110 continues to detect the position and/or the change in the position of the flow control member 202 (block 506). For example, as the flow control member 202 moves toward the valve seat 204 to the closed position, the sensor 110 detects at least the position of the flow control member 202 and the valve characterization system 300 stores corresponding positional and/or time data in the database 306.

In some examples, a velocity of the flow control member 202 is determined by the position and/or the change in the position of the flow control member 202 (block 508). In particular, the motion analyzer 308 calculates the velocity of the flow control member 202 by processing and/or analyzing stored position, movement and/or time data stored from the database 306. According to the illustrated example, the motion analyzer 308 determines the velocity based on the detection of movement of the flow control member 202.

In some examples, the velocity is compared to a threshold velocity (e.g., the threshold 428 shown in FIG. 4B) (block 510). In some examples, the comparator 310 compares the velocity (e.g., an absolute value of the velocity) of the flow control member 202 at each detected position and/or change in the position to the threshold velocity. In some examples, the threshold velocity is a pre-determined value stored in the database 306.

Next, it is determined whether the velocity meets the threshold velocity (block 512). If the valve characterization system 300 determines a value (e.g., an absolute value) of the velocity is greater than or equal to the value of the threshold velocity (block 512), control of the process returns to block 504. Otherwise, if the valve characterization system 300 determines the value of the velocity is less than the threshold velocity (block 512), control of the process proceeds to block 514.

Next, the seating point of the fluid valve 102 is determined and/or updated (block 514). In this example, the calibrator 312 and/or the motion analyzer 308 analyzes positions and/or movement of the flow control member 202 to determine the seating point. In particular, the seating point may be associated with a position of the flow control member 202 in which a velocity corresponding to that position meets the threshold velocity. In some examples, the valve characterization system 300 determines the seating point to be at or offset to such a position. In some examples, the valve characterization system 300 stores and/or updates the seating point (e.g., via the database) if the seating point is inaccurate.

In this example, a setting relating to the flow control member 202 and/or the fluid valve 102 is determined and/or updated (block 516). The calibrator 312 calculates and/or determines calibration values relating to the flow control member 202 and/or the fluid valve 102. In some examples, the calibrator 312 calculates and/or determines a value of a seating force of the fluid valve 102, for example, by using one or more suitable algorithms, equations and/or techniques related to the seating point of the fluid valve 102. In such examples, the valve characterization system 300 may store the calculated and/or determined seating force in the database 306. In other examples, the valve characterization system 300 updates the value of the seating force of the fluid valve 102 if the value is inaccurate. In some examples, after determining and/or updating the setting, the process ends.

FIG. 6 illustrates a flowchart representative of another example method 600 that can be implemented to characterize operation of one or more fluid valves (e.g., the fluid valve 102 in FIG. 1). The example method 600 can be implemented in any of the example fluid valve 102, the example valve controller 104, the example process control node 100 and/or the example valve characterization system 300 shown in FIGS. 1-3.

The example method 600 of FIG. 6 begins as the sensor 110 detects an initial position and/or a change in the position of the flow control member 202 (block 602). In some examples, the sensor 110 monitors changes in the position and/or continuously/periodically detects the position of the flow control member 202 during normal use of the fluid valve 102 (e.g., during a typical opening operation of the fluid valve 102, etc.). According to the illustrated example, when the sensor 110 detects the position and/or the change in the position of the flow control member 202, the valve characterization system 300 stores corresponding positional and/or time data in the database 306.

In this example, the flow control member 202 is moved by the actuator (block 604). In particular, the processor 108 controls the output pressure and/or force of the actuator 106 and, as a result, causes movement of the flow control member 202. In particular, as the output pressure and/or force provided by the actuator 106 increases (e.g., via an input fluid pressure provided to the actuator 106), the flow control member 202 moves away from and/or disengages the valve seat 204. In some examples, the controlled actuated movement of the flow control member 202 can be governed by parameters and/or settings stored in the database 306, which may be related to the breakout force and/or the breakout time of the fluid valve 102.

Next, the sensor 110 continues to detect the position and/or the change in the position of the flow control member 202 (block 606). For example, as the flow control member 202 moves away and/or disengages from the valve seat 204, the sensor 110 detects at least the position of the flow control member 202 and the valve characterization system 300 stores corresponding positional and/or time data in the database 306.

In some examples, an acceleration of the flow control member 202 is determined by the position and/or the change in the position of the flow control member 202 (block 608). In particular, the motion analyzer 308 calculates the acceleration of the flow control member 202 by processing and/or analyzing stored position, movement and/or time data stored from the database 306. According to the illustrated example, the motion analyzer 308 determines the acceleration based on the detection of movement of the flow control member 202.

In some examples, the acceleration is compared to a threshold acceleration (e.g., the threshold 436 shown in FIG. 4C) (block 610). In some examples, the comparator 310 compares the acceleration (e.g., an absolute value of the acceleration) of the flow control member 202 at each detected position and/or change in the position to the threshold acceleration. In some examples, the threshold acceleration is a pre-determined value stored in the database 306. Additionally or alternatively, positions of the flow control member 202 are compared to a threshold position (e.g., the threshold 436 shown in FIG. 4C). In some examples, the comparator 310 compares each detected position and/or change in the position to the threshold position. In some examples, the threshold position is a pre-determined value stored in the database 306.

Next, in some examples, it is determined whether the acceleration meets the threshold acceleration (block 612). If the valve characterization system 300 determines a value (e.g., an absolute value) of the acceleration is less than or equal to the value of the threshold acceleration (block 612), control of the process proceeds to block 614. Otherwise, if the valve characterization system 300 determines the value of the acceleration is greater than the threshold acceleration (block 612), control of the process proceeds to block 616.

In some examples, it is determined whether a position of the flow control member 202 meets the threshold position (block 614). If the valve characterization system 300 determines a value (e.g., an absolute value) of the position and/or the change in the position is less than or equal to the value of the threshold position (block 614), control of the process returns to block 604. Otherwise, if the valve characterization system 300 determines the value of the position and/or the change in the position is greater than the threshold position (block 614), control of the process proceeds to block 616.

Next, the breakout point of the fluid valve 102 is determined and/or updated (block 616). In this example, the calibrator 312 and/or the motion analyzer 308 analyzes positions and/or movement of the flow control member 202 to determine the breakout point. In particular, the breakout point is associated with a certain position of the flow control member 202 in which the acceleration corresponding to that position meets the threshold acceleration. Additionally or alternatively, in some examples, the breakout point is associated with a certain position of the flow control member 202 that meets the threshold position. In any case, according to the illustrated example, the valve characterization system 300 determines the breakout point to be at or offset to such a position of the flow control member 202. In some examples, the valve characterization system stores and/or updates the breakout point (e.g., via the database 306) if the breakout point is inaccurate.

In this example, a setting relating to the flow control member 202 and/or the fluid valve 102 is determined and/or updated (block 618). As disclosed above, the calibrator 312 calculates and/or determines calibration values relating to the flow control member 202 and/or the fluid valve 102. In some examples, the calibrator 312 calculates and/or determines value(s) of a breakout force and/or a breakout time of the fluid valve 102, for example, by using one or more suitable algorithms, equations and/or techniques related to the breakout point of the fluid valve 102. In such examples, the valve characterization system 300 may store the calculated and/or determined value(s) of the breakout force and/or the breakout time in the database 306. In other examples, the valve characterization system 300 updates the value(s) of the breakout force and/or the breakout time if the value(s) is/are inaccurate. In some examples, after determining and/or updating the setting, the process ends.

Figure 7:
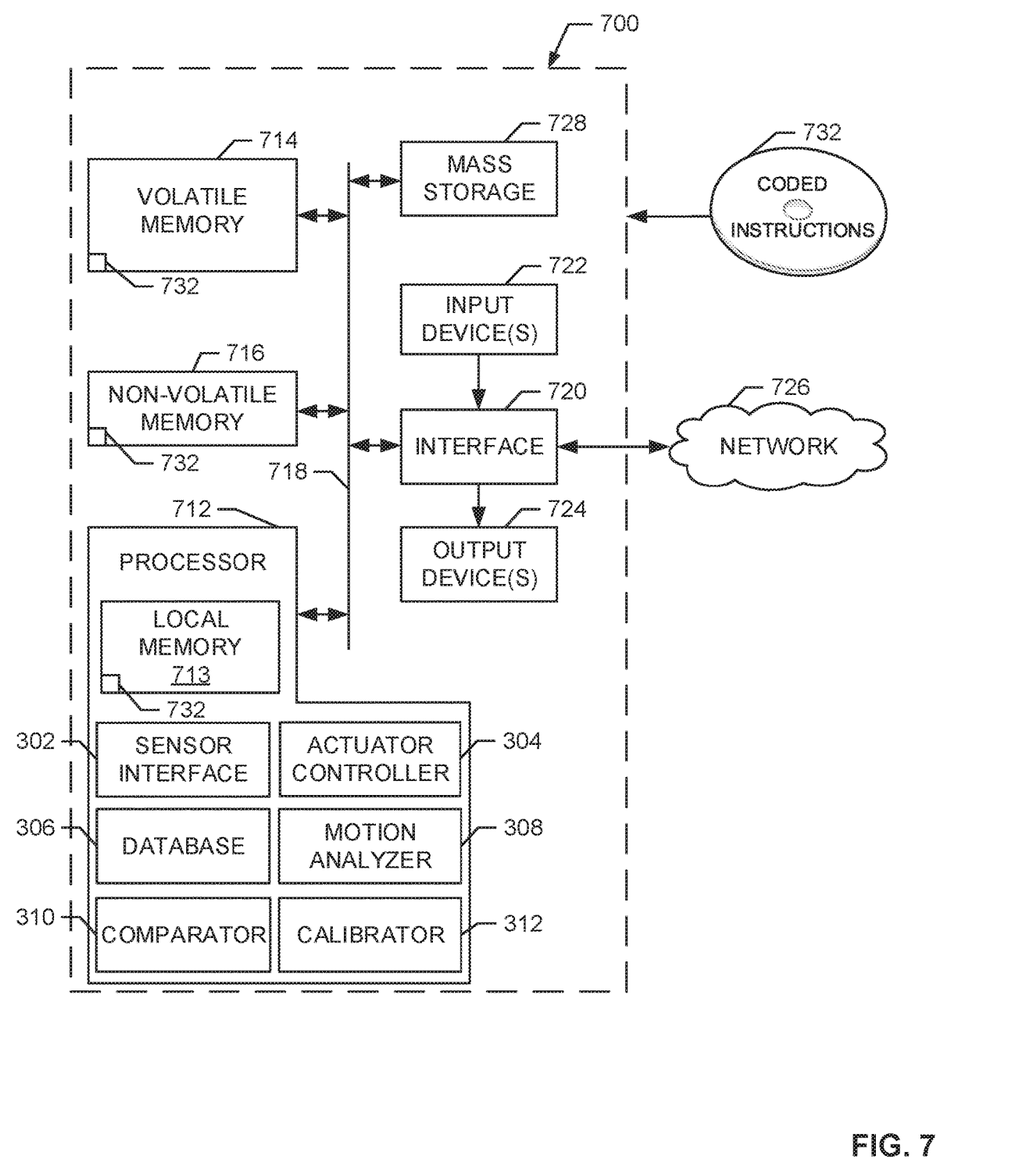
FIG. 7 is a block diagram of an example processing platform capable of executing example machine-readable instructions to implement the methods of FIGS. 5 and 6, and/or the example valve characterization system of FIG. 3.

FIG. 7 is a block diagram of an example processor platform 700 capable of executing instructions to implement the methods of FIGS. 5 and 6 and the valve characterization system 300 of FIG. 3. The processor platform 700 can be, for example, a server, a personal computer, a mobile device (e.g., a cell phone, a smart phone, a tablet such as an iPad™), a personal digital assistant (PDA), an Internet appliance, a digital video recorder, a personal video recorder or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) 722 can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

Coded instructions 732 to implement the methods of FIGS. 5 and 6 may be stored in the mass storage device 728, in the volatile memory 714, in the non-volatile memory 716, and/or on a removable tangible computer readable storage medium such as a CD or DVD.

From the foregoing, it will be appreciated that the above disclosed apparatus and methods accurately and quickly characterize operation of fluid control valves. In particular, the examples disclosed herein determine and/or update a seating point and/or a breakout point associated with a fluid valve based on movement of a flow control member of the fluid valve to improve control of the fluid valve. Some disclosed examples advantageously use the determined seating point and/or breakout point to calculate, determine and/or update one or more parameters and/or settings relating to the flow control member and/or the fluid valve. Further, by automating the process of determining the seating point and/or the breakout point of the fluid valve, characterization can be done rapidly and in parallel while reducing user error and excess time often necessitated by manual determination(s).

Although certain example apparatus and methods have been disclosed herein, the scope of coverage of this patent is not limited thereto. On the contrary, this patent covers all apparatus and methods fairly falling within the scope of the claims of this patent. While the examples disclosed herein are shown in relation to process control valves, the examples disclosed herein may be applied to any valve or fluid control apparatus.

What is claimed is:

1. An apparatus comprising:
   a fluid valve having a valve seat and a flow control member to sealingly engage the valve seat;
   a sensor to detect a change in position of the flow control member; and
   a processor to cause movement of the flow control member and generate an acceleration curve based on the movement, the processor to determine a breakout point corresponding to the flow control member based on a peak of the-acceleration curve.

2. The apparatus of claim 1, wherein the sensor includes a hall effect sensor or a potentiometer to detect the change in position.

3. The apparatus of claim 1, wherein the processor is to further compare the acceleration curve to a respective threshold to determine the breakout point.

4. The apparatus of claim 1, wherein the processor is to further update a setting relating to the flow control member based on the breakout point.

5. The apparatus of claim 1, wherein the processor is to further analyze a trend associated with the breakout point to calculate an input setting.

6. The apparatus of claim 1, wherein the processor is disposed in a valve controller operatively coupled to the fluid valve.

7. The apparatus of claim 1, wherein the processor is to further determine a portion of the acceleration curve to search for the peak of the acceleration curve.

8. The apparatus of claim 1, wherein the sensor is to detect the change in position of the flow control member based on measuring a linear movement of the flow control member.

9. A method comprising:
   detecting, via a sensor, a change in position of a flow control member of a fluid valve, the flow control member to sealingly engage a valve seat;
   causing the flow control member to move;
   generating, via instructions executed by a processor, an acceleration curve based on the movement of the flow control member; and
   determining, via instructions executed by the processor, a breakout point corresponding to the flow control member based on a peak of the acceleration curve.

10. The method of claim 9, further including monitoring changes in a position of the flow control member, and updating the breakout point based on the changes.

11. The method of claim 9, further including comparing, via instructions executed by the processor, the acceleration curve to a threshold, and at least partially determining the breakout point based on the comparison.

12. The method of claim 9, further including updating, via the processor, a setting relating to the flow control member based on the breakout point.

13. The method of claim 9, further including determining a portion of the acceleration curve to search for the peak of the acceleration curve.

14. A non-transitory machine-readable storage medium comprising instructions which, when executed, cause a processor to:
   detect a change in position of a flow control member via a sensor, the flow control member to sealingly engage a valve seat of a fluid valve;
   cause the flow control member to move the flow control member;
   generate an acceleration curve based on the movement of the flow control member; and
   calculate a breakout point corresponding to the flow control member based on a peak of the acceleration curve.

15. The non-transitory machine-readable storage medium of claim 14, further including instructions which, when executed, monitor further changes in position of the flow control member, and update the breakout point based on the changes.

16. The non-transitory machine-readable storage medium of claim 14, further including instructions which, when executed, cause the processor to compare the acceleration curve to a threshold to determine the breakout point.

17. The non-transitory machine-readable storage medium of claim 14, further including instructions which, when executed, cause the processor to update a setting relating to the flow control member based on the breakout point.

18. The non-transitory machine-readable storage medium of claim 14, further including instructions which, when executed, cause the processor to determine a portion of the acceleration curve to search for the peak of the acceleration curve.

* * * * *

UNITED STATES PATENT AND TRADEMARK OFFICE
CERTIFICATE OF CORRECTION

PATENT NO. : 10,719,089 B2
APPLICATION NO. : 15/599145
DATED : July 21, 2020
INVENTOR(S) : Thomas A. Imsland et al.

Page 1 of 1

It is certified that error appears in the above-identified patent and that said Letters Patent is hereby corrected as shown below:

In the Claims
Column 15, Line 22, Claim 1:
After "peak of the" remove -- - --.

Signed and Sealed this
Eighth Day of December, 2020

Andrei Iancu
*Director of the United States Patent and Trademark Office*